(12) United States Patent
Okada et al.

(10) Patent No.: US 10,209,521 B2
(45) Date of Patent: Feb. 19, 2019

(54) HEAD-MOUNTED DISPLAY

(71) Applicant: KYOCERA Corporation, Kyoto-shi, Kyoto (JP)

(72) Inventors: Keisuke Okada, Yokohama (JP); Kouichirou Fujihara, Yokohama (JP); Yoshiteru Kurosaki, Yokohama (JP); Tomohiro Degawa, Tokyo (JP); Jun Matsuzawa, Kawasaki (JP); Susumu Ozawa, Ebina (JP); Shingo Ito, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/469,814

(22) Filed: Mar. 27, 2017

(65) Prior Publication Data

US 2017/0276949 A1 Sep. 28, 2017

(30) Foreign Application Priority Data

Mar. 28, 2016 (JP) .................................. 2016-064379

(51) Int. Cl.
G09G 5/00 (2006.01)
G02B 27/01 (2006.01)
G02C 11/00 (2006.01)
G06F 3/06 (2006.01)
G09G 3/00 (2006.01)
G09G 3/30 (2006.01)
(Continued)

(52) U.S. Cl.
CPC ..... *G02B 27/0172* (2013.01); *G02B 27/0176* (2013.01); *G02C 11/10* (2013.01); *G06F 3/06* (2013.01); *G09G 3/002* (2013.01); *G09G 3/30* (2013.01); *G09G 3/36* (2013.01); *H04W 4/00* (2013.01); *G02B 27/01* (2013.01); *G02B 27/017* (2013.01); *G02B 2027/014* (2013.01); *G02B 2027/0178* (2013.01)

(58) Field of Classification Search
CPC .. G02B 27/01; G02B 27/017; G02B 27/0176; G02B 2027/0178; G02C 11/10; G06F 1/163; G06F 1/1632; G06F 1/1675; G06F 3/011; G06F 3/038; G06F 3/06; G09G 3/00; G09G 3/30; G09G 3/36; G09G 5/00; H04W 4/00

See application file for complete search history.

(56) References Cited

U.S. PATENT DOCUMENTS 5,428,528 A * 6/1995 Takenouchi ............ A63F 13/12
273/237
5,565,745 A * 10/1996 Huether .................. A63F 13/00
345/8

(Continued)

FOREIGN PATENT DOCUMENTS

JP 2012-231259 A 11/2012

*Primary Examiner* — Joe H Cheng
(74) *Attorney, Agent, or Firm* — Hauptman Ham, LLP (57) ABSTRACT

A head-mounted display according to one aspect includes an interface capable of connecting a cartridge, and a controller configured to execute an application based on data obtained from the cartridge when the cartridge is connected to the interface. The controller is configured to explore other devices existing within an interconnectable area in executing the application, and communicate and connect with other devices associated to the application among other explored devices.

11 Claims, 8 Drawing Sheets

(51) Int. Cl.
*G09G 3/36* (2006.01)
*H04W 4/00* (2018.01)

(56) References Cited

U.S. PATENT DOCUMENTS

| | | | | |
|---|---|---|---|---|
| 5,618,045 | A * | 4/1997 | Kagan | A63F 13/12 463/40 |
| 5,683,297 | A * | 11/1997 | Raviv | A63F 13/02 273/DIG. 17 |
| 6,921,336 | B1 * | 7/2005 | Best | A63F 13/10 463/32 |
| 8,572,176 | B2 * | 10/2013 | McKenna | H04W 4/06 463/62 |
| 8,854,282 | B1 * | 10/2014 | Wong | G06F 3/14 345/7 |
| 2004/0180718 | A1 * | 9/2004 | Uchida | A63F 13/10 463/31 |
| 2005/0026695 | A1 * | 2/2005 | Tsuchiyama | A63F 13/12 463/42 |
| 2006/0247061 | A1 * | 11/2006 | Nogami | A63F 13/12 463/42 |
| 2007/0093294 | A1 * | 4/2007 | Serafat | A63F 13/12 463/39 |
| 2012/0268433 | A1 | 10/2012 | Horii et al. | |
| 2013/0083003 | A1 * | 4/2013 | Perez | G06F 3/005 345/419 |
| 2013/0324244 | A1 * | 12/2013 | Mikhailov | A63F 13/04 463/31 |
| 2014/0016800 | A1 * | 1/2014 | Dong | G02B 27/02 381/151 |
| 2014/0098132 | A1 * | 4/2014 | Fein | G06T 19/006 345/633 |
| 2014/0168266 | A1 * | 6/2014 | Kimura | G02B 27/0172 345/633 |
| 2014/0180817 | A1 * | 6/2014 | Zilkha | G06Q 30/02 705/14.55 |
| 2014/0361976 | A1 * | 12/2014 | Osman | G02B 27/0172 345/156 |
| 2014/0368980 | A1 * | 12/2014 | Nanavati | G06Q 30/016 361/679.03 |
| 2015/0099946 | A1 * | 4/2015 | Sahin | A61B 5/16 600/301 |
| 2015/0223731 | A1 * | 8/2015 | Sahin | A61B 5/16 600/301 |
| 2015/0348327 | A1 * | 12/2015 | Zalewski | G06F 3/01 345/419 |
| 2016/0049012 | A1 * | 2/2016 | Torii | G06T 19/006 345/633 |
| 2016/0344882 | A1 * | 11/2016 | Tsujioka | G06F 3/011 |
| 2017/0227779 | A1 * | 8/2017 | Kato | G02B 27/02 |
| 2017/0276941 | A1 * | 9/2017 | Fujihara | G02B 27/017 |
| 2017/0276950 | A1 * | 9/2017 | Ozawa | G02B 27/0172 |
| 2017/0277221 | A1 * | 9/2017 | Degawa | G06F 1/163 |
| 2017/0277222 | A1 * | 9/2017 | Matsuzawa | G06F 1/163 |
| 2017/0277223 | A1 * | 9/2017 | Matsuzawa | G06F 1/1632 |
| 2017/0278453 | A1 * | 9/2017 | Kurosaki | G09G 3/2096 |

* cited by examiner

HEAD-MOUNTED DISPLAY

CROSS-REFERENCE TO RELATED APPLICATION(S)

The present application claims priority to and incorporates by reference the entire contents of Japanese Patent Application No. 2016-064379 filed in Japan on Mar. 28, 2016.

BACKGROUND

1. Field

The present invention relates to a head-mounted display.

2. Description of the Related Art

Known in the related art is a head-worn display device.

SUMMARY

A head-mounted display according to one aspect includes an interface capable of connecting a cartridge, and a controller configured to execute an application based on data obtained from the cartridge when the cartridge is connected to the interface. The controller is configured to explore other devices existing within an interconnectable area in executing the application, and communicate and connect with other devices associated to the application among other explored devices.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

It is desirable to further improve usability of the display device. A head-mounted display according to embodiments will be described in detail with reference to the drawings. A user of the head-mounted display according to some embodiments can be provided with various types of services via the head-mounted display by, for example, connecting a cartridge to the head-mounted display to feed a specific content from the cartridge into the head-mounted display. A cartridge connectable to the head-mounted display may be provided, for example, from various types of facilities, whether outdoor or indoor, capable of providing services via the head-mounted display, such as business parks, shopping centers, fashion buildings, parks, amusement facilities, high-tech parks, and residential facilities.

Figure 1:
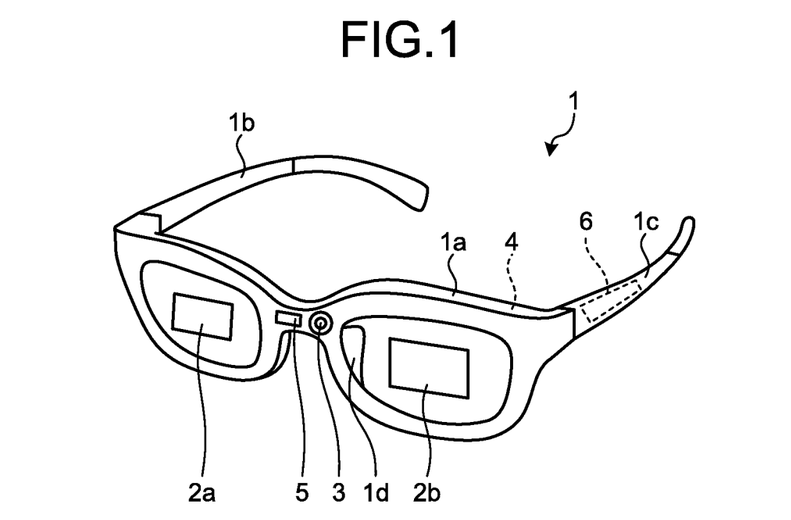
FIG. 1 is a view illustrating an appearance schematic configuration of a head-mounted display according to embodiments.

FIG. 1 is a view illustrating an appearance schematic configuration of the head-mounted display according to some embodiments. As illustrated in FIG. 1, a head-mounted display 1 is in a spectacle shape and includes a front portion 1a, temple portions 1b and 1c, and a support portion 1d. The shape of the head-mounted display 1 illustrated in FIG. 1 is only an example, and is not limited to the shape illustrated in FIG. 1 as long as functions as a head-worn wearable device can be realized.

The front portion 1a is formed to surround least a part of outer peripheral parts of displays 2a and 2b. When a user of the head-mounted display 1 wears the head-mounted display 1, the front portion 1a becomes a part arranged in front of eyes of the user. The support portion 1d consists of one pair (not illustrated), and touches a nose of the user to hold it when the user of the head-mounted display 1 wears the head-mounted display 1. The support portion 1d helps the head-mounted display 1, when worn by the user thereof, to be supported in a mounted attitude as much as possible without falling off a face of the user in a gravity direction.

In the front portion 1a, imagers 3 and 4, a detector 5, an operation unit 6, and the like are also mounted. Each component mounted in the front portion 1a illustrated in FIG. 1 is only an example, and is not limited to the example illustrated in FIG. 1.

The temple portions 1b and 1c are formed in a similar rod-like shape. When the user of the head-mounted display 1 wears the head-mounted display 1, the temple portions 1b and 1c serve as parts each of which is arranged along a side of the user's head. One ends of the temple portions 1b and 1c serve as parts each of which is foldably connected to the front portion 1a via a hinge (not illustrated). When the user of the head-mounted display 1 wears the head-mounted display 1, the other ends of the temple portions 1b and 1c serve as parts each of which is placed on an ear of the user. As with the support portion 1d, the temple portions 1b and 1c help the head-mounted display 1, when worn by the user thereof, to be supported in the mounted attitude as much as possible without falling off the face of the user in the gravity direction.

Figure 2:
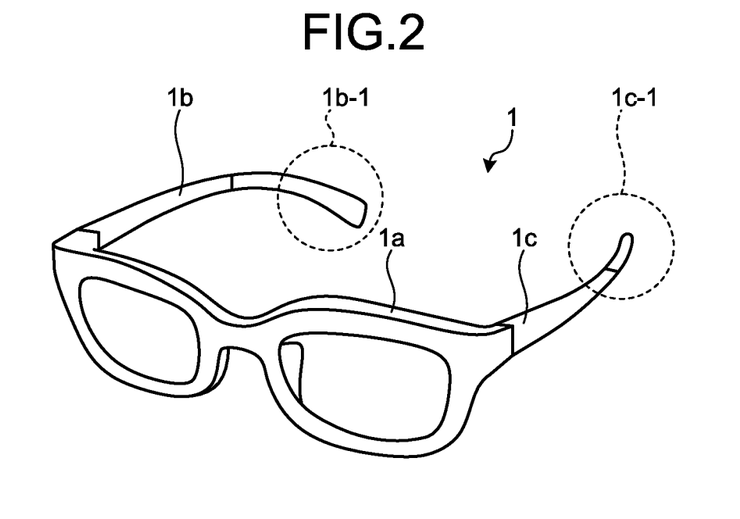
FIG. 2 is a view illustrating an exemplary mounting position of an interface according to embodiments.
Figure 3:
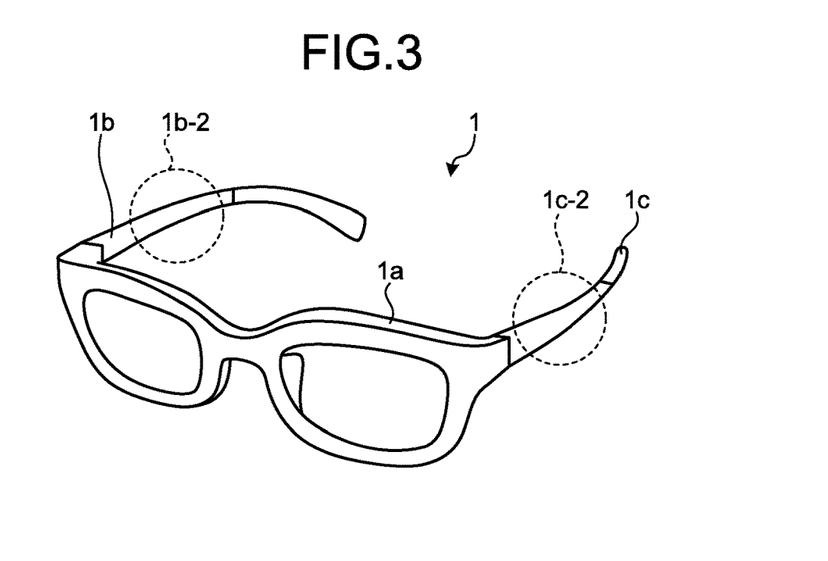
FIG. 3 is a view illustrating an exemplary mounting position of an interface according to embodiments.
Figure 4:
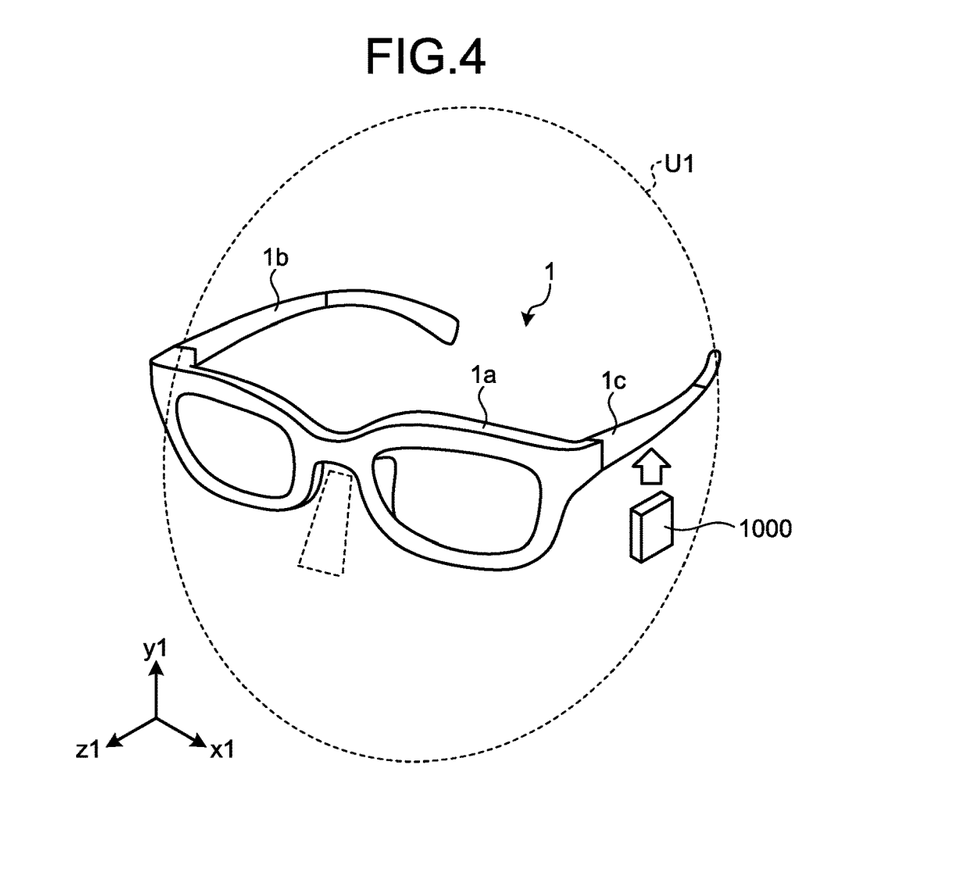
FIG. 4 is a view illustrating an exemplary opening direction of an interface according to embodiments.
Figure 5:
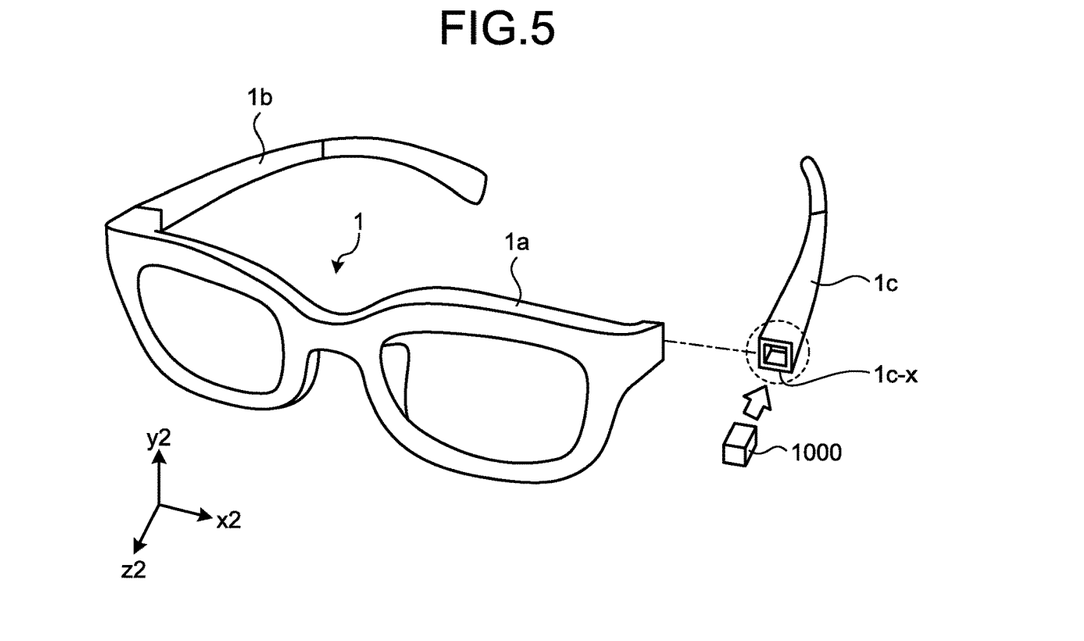
FIG. 5 is a view illustrating another exemplary mounting position and opening direction of an interface according to embodiments.
Figure 6:
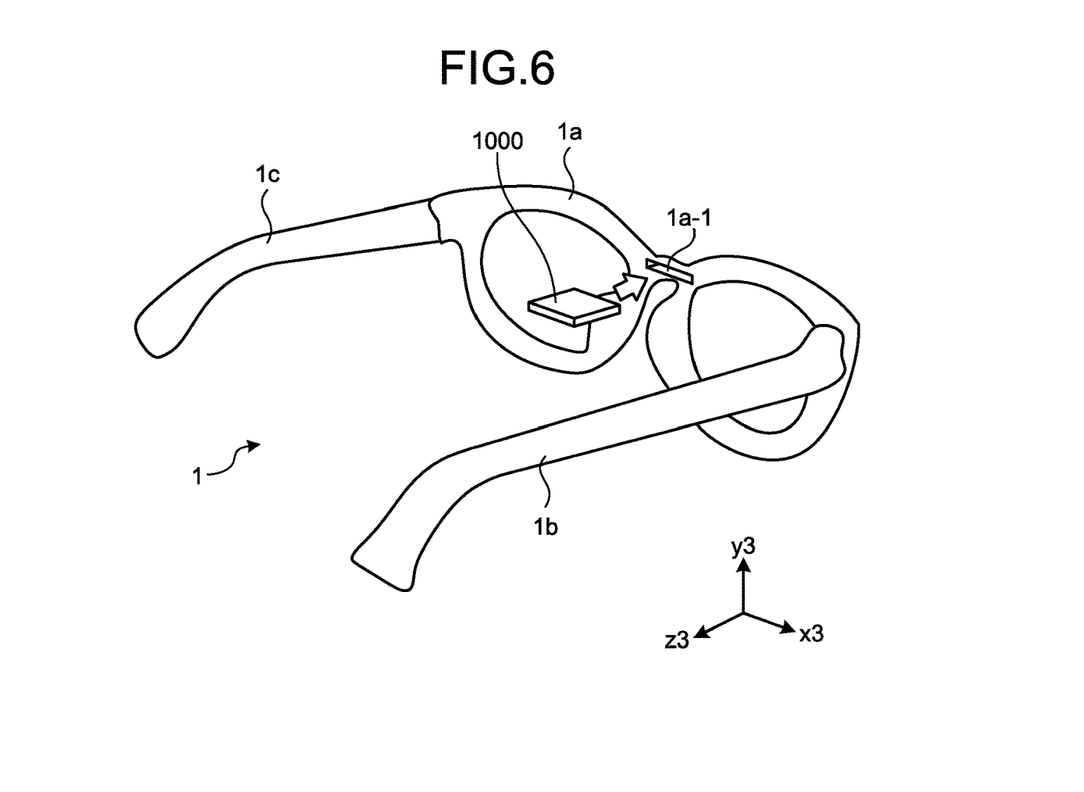
FIG. 6 is a view illustrating a further exemplary mounting position and opening direction of an interface according to embodiments.

Examples of mounting position and opening direction of an interface included in a head-mounted display will be described below using FIGS. 2 to 6. FIGS. 2 and 3 are views illustrating exemplary mounting positions of the interface according to some embodiments. FIG. 4 is a view illustrating an exemplary opening direction of the interface according to some embodiments. FIGS. 5 and 6 are views illustrating other exemplary mounting positions and opening directions of the interface according to some embodiments.

As illustrated in FIG. 2, the head-mounted display 1 can have the interface mounted to a vicinity of end 1b-1, one of the ends of the temple portion 1b not connected to the front portion 1a, and a vicinity of end 1c-1 close to one of the ends of the temple portion 1c not connected to the front portion 1a, respectively. Alternatively, as illustrated in FIG. 3, the head-mounted display 1 can have the interface mounted to a vicinity of center 1b-2 of the temple portion 1b and a center 1c-2 of the temple portion 1c, respectively. In a case, for example, where the head-mounted display 1 is heavier than the temple portions 1b and 1c due to inclusion of, for example, the imagers 3 and 4, the detector 5, and the operation unit 6 in the front portion 1a, connecting a cartridge 1000 to the temple portion 1b (or temple portion 1c) can bring a weight of the temple portion 1b (or temple portion 1c) close to one of the front portion 1a and improve a wearing sense.

In a case where the interface is mounted in the temple portions 1b and 1c, the interface opens downward in a vertical direction when the head-mounted display 1 is worn by a user U1 thereof (see FIG. 4). With this sort of configuration, the head-mounted display 1 can prevent, for example, dust from entering from an opening part (part open outward) included in the interface.

A direction where the interface opens will be described using FIG. 4. An x1 axis, a y1 axis, and a z1 axis of a coordinate axes illustrated in FIG. 4 are assumed to be perpendicular to one another. In an example illustrated in FIG. 4, a longitudinal direction of the front portion 1a of the head-mounted display 1 is assumed to be consistent with a direction parallel to an x1 axis direction of the coordinate axes illustrated in FIG. 4. The interface opens in a direction where the cartridge 1000 can be inserted into and connected to the head-mounted display 1. In the example illustrated in FIG. 4, although not specified in the figure, the interface opens, for example, downward in a vertical direction, that is, in a direction parallel to a negative direction of the y1 axis.

The head-mounted display 1 may, as illustrated in FIGS. 2 and 3, have the interface mounted in each or either of the temple portions 1b and 1c.

Another example of the mounting position and opening direction of the interface will be described using FIG. 5. An x2 axis, a y2 axis, and a z2 axis of a coordinate axes illustrated in FIG. 5 are assumed to be perpendicular to one another. In the example illustrated in FIG. 5, a longitudinal direction of the front portion 1a of the head mounted display 1 is assumed to be consistent with a direction parallel to an x2 axis direction of the coordinate axes illustrated in FIG. 5. As illustrated in FIG. 5, the head-mounted display 1 can have the interface mounted in an abutment portion 1c-x of the temple portion 1c, which is a position where the temple portion 1c touches the front portion 1a when the temple portion 1c completely opens. The interface opens with the cartridge 1000 capable of being inserted and connected. The example illustrated in FIG. 5 illustrates the interface open in a direction parallel to a positive direction of the z2 axis of the coordinate axes illustrated in FIG. 5. With this sort of configuration, when the temple portion 1c completely opens, an opening part of an interface 10 is closed by the front portion 1a. Therefore, the head-mounted display 1 can protect the cartridge 1000 against, for example, external impact.

In the example illustrated in FIG. 5, it is possible to specify that the head-mounted display 1 has an opening part in the temple portion 1b (or temple portion 1c), opening in a longitudinal direction of the temple portion 1b (or temple portion 1c).

A further example of the mounting position and opening direction of the interface will be described using FIG. 6. An x3 axis, a y3 axis, and a z3 axis of a coordinate axes illustrated in FIG. 6 are assumed to be perpendicular to one another. In the example illustrated in FIG. 6, a longitudinal direction of the front portion 1a of the head-mounted display 1 is assumed to be consistent with a direction parallel to an x3 axis direction of the coordinate axes illustrated in FIG. 6. As illustrated in FIG. 6, the head-mounted display 1 may have the interface mounted in an area 1a-1 of the front portion 1a, opposite to the face of the user. The interface opens with the cartridge 1000 capable of being inserted and connected. The example illustrated in FIG. 6 illustrates the interface being open in a direction parallel to a positive direction of the z3 axis of the coordinate axes illustrated in FIG. 6. With this sort of configuration, the head-mounted display 1 can protect the cartridge 1000 against, for example, external impact with the cartridge 1000 connected to the interface.

Figure 7:
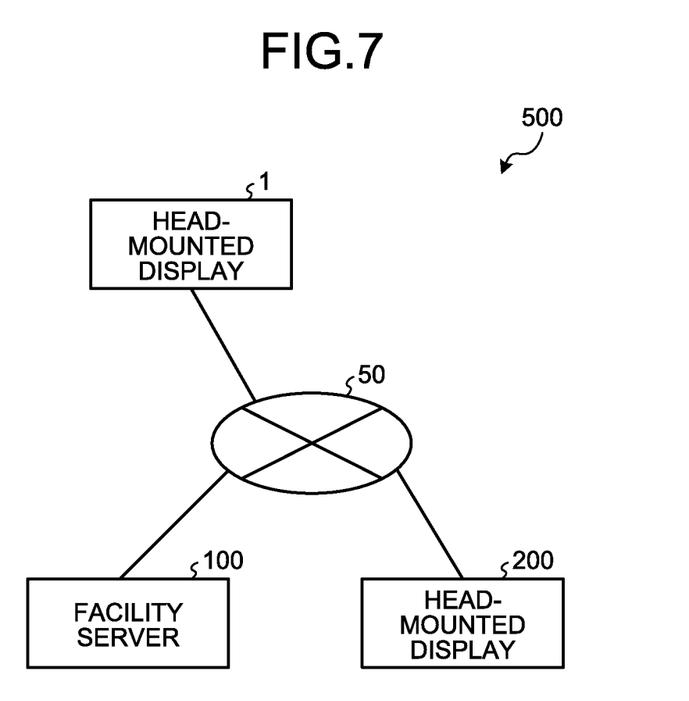
FIG. 7 is a diagram illustrating an exemplary overall configuration of a system according to embodiments.

FIG. 7 is a diagram illustrating an exemplary overall configuration of a system according to embodiments. As illustrated in FIG. 7, a system 500 according to some embodiments includes the head-mounted display 1, a facility server 100, and a head-mounted display 200. The head-mounted display 1, the facility server 100, and the head-mounted display 200 are communicably connected to one another via a communication network 50. The facility server 100 is a device installed in a facility where cartridges connectable to the head-mounted displays 1 and 200 are lent to users of the facility. The head-mounted displays 1 and 200 are devices respectively worn by the users of the facility where the facility server 100 is installed.

Figure 8:
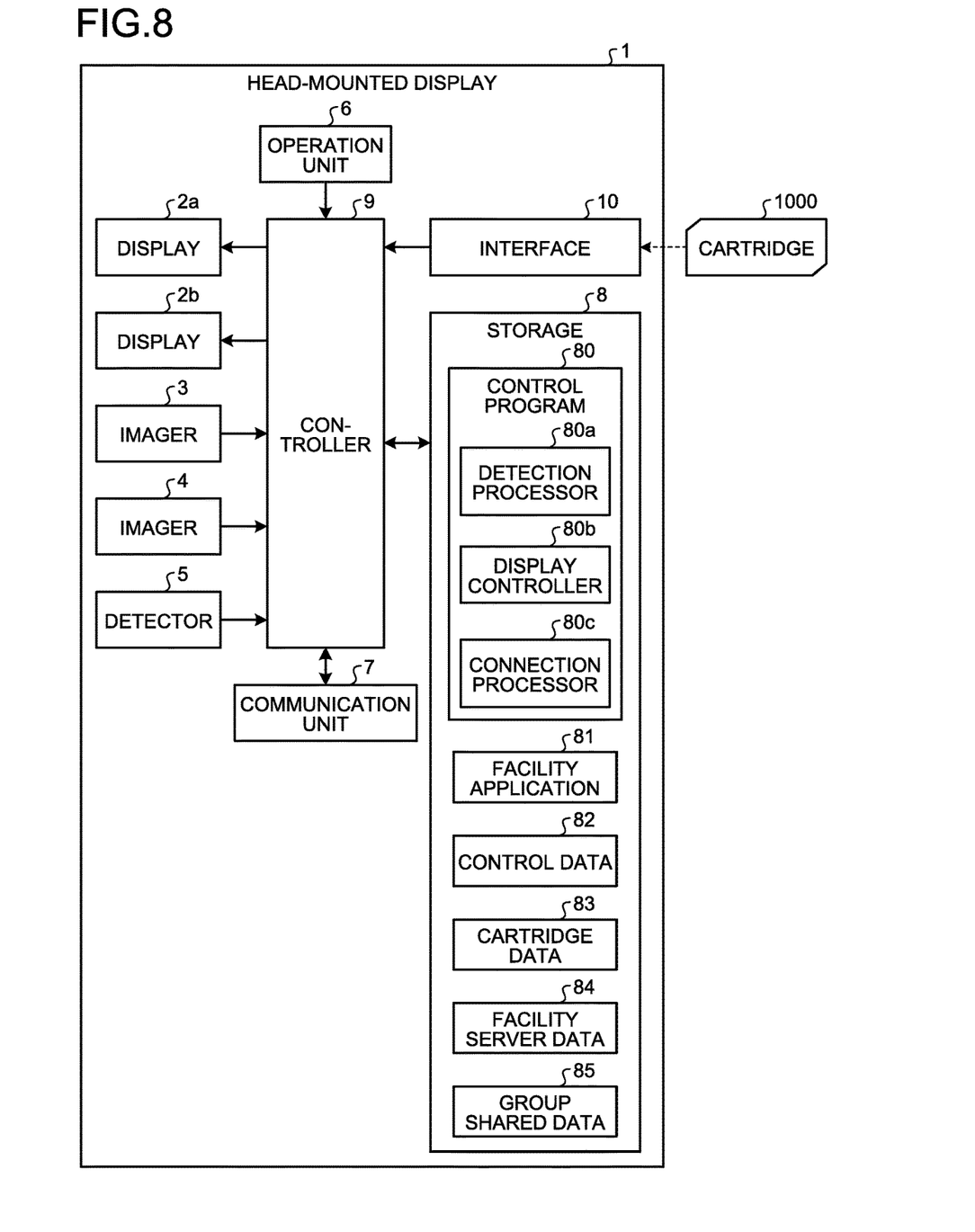
FIG. 8 is a block diagram illustrating an exemplary functional configuration of a head-mounted display according to embodiments.

FIG. 8 is a block diagram illustrating an exemplary functional configuration of the head-mounted display according to embodiments. The head-mounted display 1 has the same functional configuration as the head-mounted display 200. Therefore, the head-mounted display 1 will be described below.

As illustrated in FIG. 8, the head-mounted display 1 includes the displays 2a and 2b, the imagers 3 and 4, the detector 5, the operation unit 6, a communication unit 7, storage 8, a controller 9, and the interface 10.

The displays 2a and 2b can have semi-transmissive or transmissive display devices such as a liquid crystal display and an organic electro-luminescence (EL) panel. The displays 2a and 2b display a variety of information in accordance with a control signal input from the controller 9. The displays 2a and 2b may be projection devices that project images on retinas of the user by using a light source such as a laser beam.

The imagers 3 and 4 electronically capture an image by using an image sensor such as a charge coupled device image sensor (CCD) or a complementary metal oxide semiconductor (CMOS). The imagers 3 and 4 convert the captured image into a signal to output to the controller 9. The imager 3 is an out-camera that photographs, for example, foreground of the user wearing the head-mounted display 1. The imager 4 is an in-camera that photographs, for example, the user wearing the head-mounted display 1.

The detector 5 executes various types of detection. The detector 5 can detect targets to be detected and, for example, changes in state of the targets to be detected by using at least one of visible light, infrared light, ultraviolet light, radio waves, sound waves, magnetism, and capacitance. The targets to be detected include motionless objects, moving objects, living objects, and non-living objects.

The operation unit 6 receives from the user operation input such as changes in various types of settings including activation, stop, and operation settings of the head-mounted display 1. The operation unit 6 converts the operation input received from the user into a signal to output to the controller 9.

The communication unit 7 can communicate with other devices. The communication unit 7 can transmit and receive a variety of information traded among other head-mounted displays, facility servers installed in the facility, or the like by using, for example, predetermined communication protocol. The communication unit 7 can communicate and connect with other head-mounted displays. The communication unit 7 can support one or a plurality of communication standards for near field communication. Examples of the communication standards for near field communication include, but are not limited to, IEEE802.11, Bluetooth (registered trademark), Infrared Data Association (IrDA), near field communication (NFC), and wireless personal area network (WPAN).

The storage 8 stores programs and data. Programs stored in the storage 8 include a control program 80. Applications stored in the storage 8 include a facility application 81. Data stored in the storage 8 include control data 82, cartridge data 83, facility server data 84, and group shared data 85.

The storage 8 may be used as a work area where processing results of the controller 9 are temporarily stored. The storage 8 may include a semiconductor storage medium and an arbitrary non-transitory storage medium such as a magnetic storage medium. The storage 8 may include a plurality of types of storage media. The storage 8 may include a combination of a storage medium such as a memory card, an optical disc, or a magneto-optical disc and a reader of the storage medium. The storage 8 may include a storage device used as a temporary storage area such as random access memory (RAM). Programs stored in the storage 8 may include a program (illustration omitted) that supports operation of an application. The programs, applications, and data stored in the storage 8 may be obtained from other devices such as the facility server 100 by wireless or wired communication.

The control program 80 provides functions regarding various types of controls of the head-mounted display 1. The functions provided by the control program 80 include a detection processor 80*a*, a display controller 80*b*, and a connection processor 80*c*.

The detection processor 80*a* provides, based on detection results of the detector 5, functions for various types of controls of the head-mounted display 1. The display controller 80*b* provides functions for display control of the displays 2*a* and 2*b*. The connection processor 80*c* links with the facility application 81 and provides, based on information obtained from the cartridge 1000 connected to the interface 10, functions for a wireless connection communicably with other devices such as the head-mounted display 200 (hereinafter interconnection).

The functions provided by the connection processor 80*c* include those of, for example, transiting to a state allowing interconnection, selecting other apparatuses as connecting partners (hereinafter pairing), and interconnecting with the paired apparatuses. The paring function provided by the connection processor 80*c* includes a function of pairing with other apparatuses which have identical group identifiers included in the cartridge data 83.

The facility application 81 is, for example, an application that provides a function for the user of the head-mounted display 1 to use the facilities and apparatuses installed in the facility via the head-mounted display 1. At an amusement park, for example, the facility application 81 is equivalent to an application for displaying a variety of information on the amusement park such as a map thereof, and for outputting videos, sounds, and the like when various kinds of attractions installed in the amusement park are played. In a case where there are a plurality of facilities and apparatuses installed in the facility, the facility application 81 may be configured as an application set including applications corresponding to each of the facilities and apparatuses. The facility application 81 may be obtained from the cartridge 1000 connected to the interface 10.

The control data 82 are data used for various types of controls of the head-mounted display 1, carried out by the functions provided by the control program 80.

The cartridge data 83 are data obtained from the cartridge 1000 connected to the interface 10. The cartridge data 83 include, for example, group identifiers and reference data for facility applications. The group identifiers are used for identifying head-mounted displays to be interconnected when the facility application 81 is executed. At an amusement park, for example, the group identifiers are used, in an attraction where a game is proceeded by a group, for interconnecting the head-mounted display 1 and other head-mounted displays with which the same attraction is played. The reference data for facility applications are used in processing executed by the facility application 81. At an amusement park, for example, the reference data for facility applications are used for the facility application 81 to output contents such as videos and sounds to the head-mounted display 1 in accordance with progresses of the games in attractions. When configured as an application set including applications corresponding to each of the facilities and apparatuses installed in the facility, the reference data for facility applications may be configured as a data set including data corresponding to each application.

The facility server data 84 are data provided by the facility server 100. At an amusement park, for example, the facility server data 84 are used for the facility application 81 to display on the head-mounted display 1 a variety of information on the amusement park except one obtained from the cartridge 1000.

The group shared data 85 are data shared as necessary among other interconnected head-mounted displays. At an amusement park, for example, the group shared data 85 are data on progresses of games transmitted and received among other interconnected head-mounted displays in accordance with the progresses of the games.

The controller 9 includes a processing device. The processing device may include, for example, a central processing unit (CPU), a system-on-a-chip (SoC), a micro control unit (MCU), a field-programmable gate array (FPGA), and a coprocessor, but is not limited to a case where these are included. The controller 9 integrally controls operation of the head-mounted display 1 to realize various types of functions. Specifically, the controller 9 realizes various types of controls of the head-mounted display 1 by executing orders included in the control program 80 stored in the storage 8 while referring as necessary to the control data 82 stored in the storage 8.

For example, the controller 9 coordinates with the facility application 81 by executing the control program 80, and communicably interconnects with other devices such as the head-mounted display 200 based on the information obtained from the cartridge 1000 connected to the interface 10.

The interface 10 opens with the cartridge 1000 capable of being connected. Once the cartridge 1000 is connected, the interface 10 outputs to the controller 9 a connection detecting signal for notifying the controller 9 that the cartridge 1000 is connected. The interface 10 obtains, from the connected cartridge 1000, data stored in the cartridge 1000 and outputs the obtained data to the controller 9.

Figure 9:
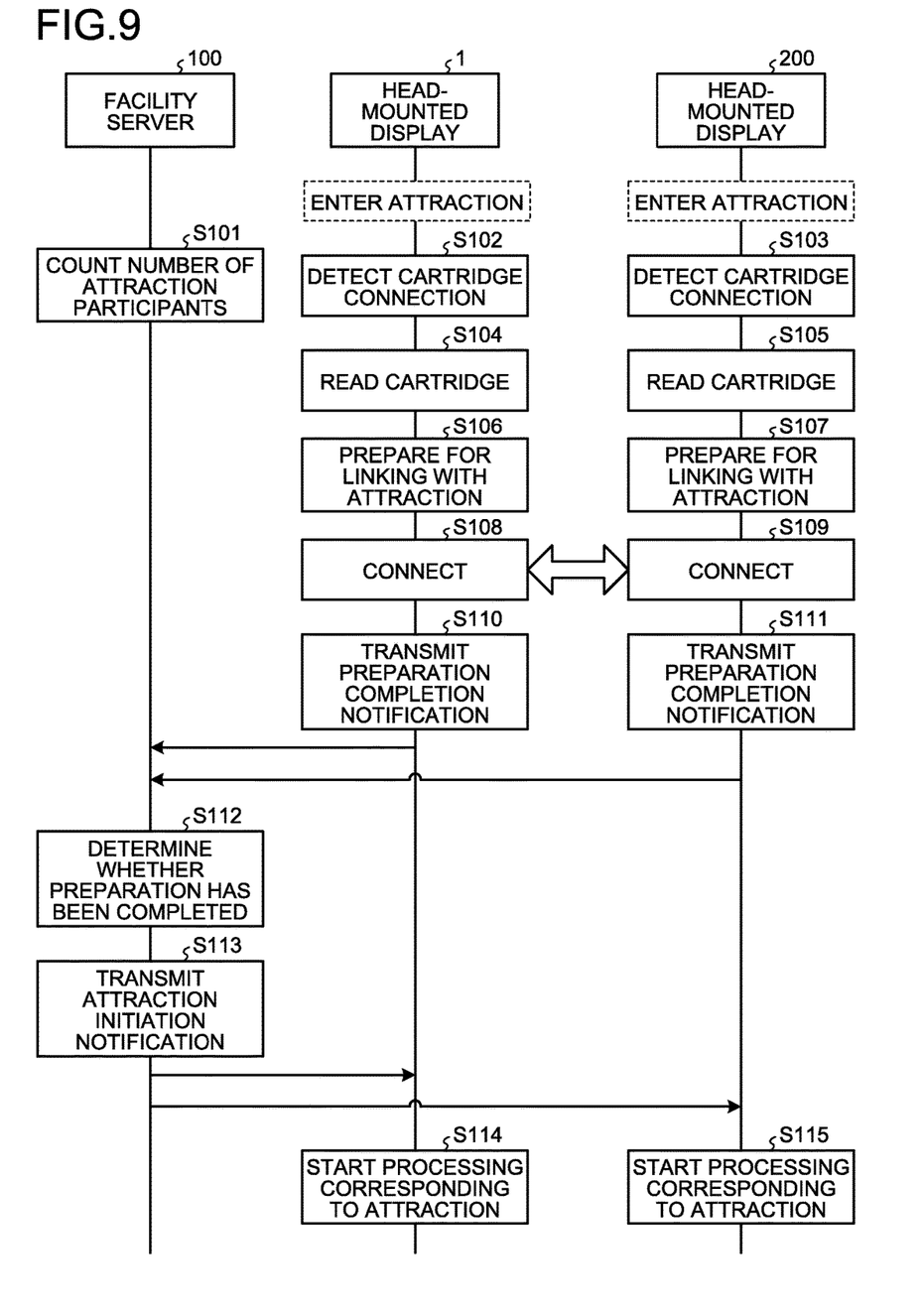
FIG. 9 is a diagram illustrating exemplary processing of a system according to embodiments.
Figure 10:
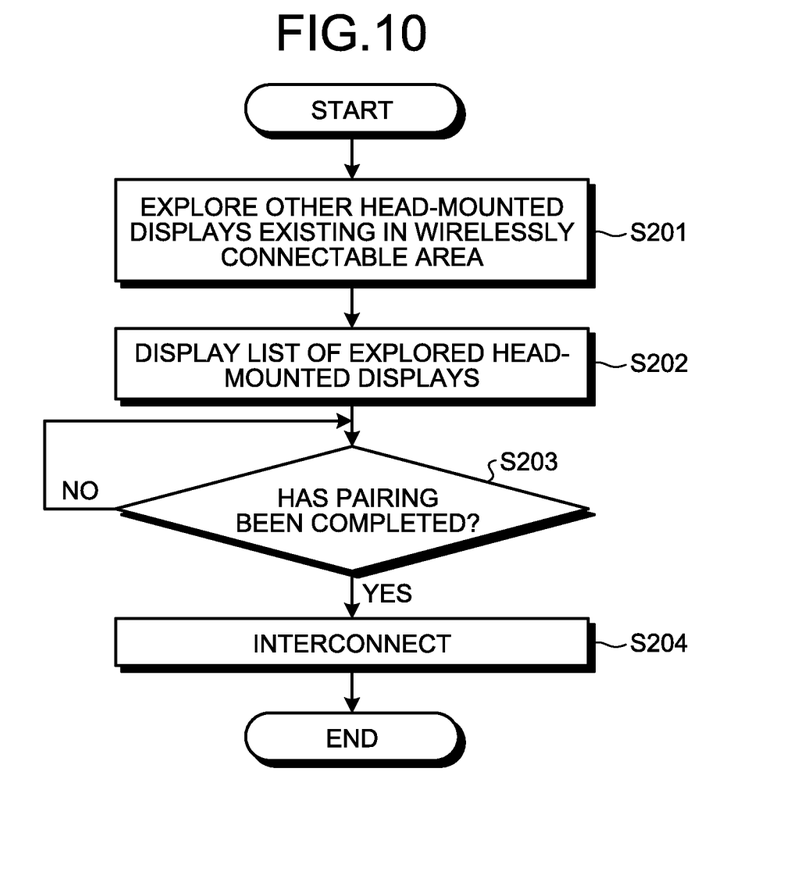
FIG. 10 is a flowchart illustrating an exemplary connection according to embodiments.

Processing according to embodiments will be described using FIGS. 9 and 10. FIG. 9 is a diagram illustrating exemplary processing of a system according to embodiments. FIG. 10 is a flowchart illustrating an exemplary connection according to embodiments.

Exemplary processing of the system according to some embodiments will be described using FIG. 9. FIG. 9 illustrates exemplary processing when the users of the head-mounted displays 1 and 200 enter a same attraction where a game is proceeded by a group, among attractions installed in an amusement park.

As illustrated in FIG. 9, the facility server 100 counts the number of participants in attractions (Step S101).

The head-mounted display 1 detects a connection of the cartridge 1000 (Step S102). Similarly, the head-mounted display 200 detects a connection of the cartridge 1000 (Step S103).

After detecting the connection of the cartridge 1000, the head-mounted display 1 reads the cartridge 1000 (Step S104). Similarly, after detecting the cartridge 1000, the head-mounted display 200 reads the cartridge 1000 (Step S105).

After reading the cartridge 1000, the head-mounted display 1 prepares for linking with an attraction (Step S106). Similarly, after reading the cartridge 1000, the head-mounted display 200 prepares for linking with an attraction (Step S107). An example of preparation for initiating an attraction includes, but is not limited to, reading in advance an application corresponding to the attraction and data for executing the application from the facility application 81. The attraction corresponds to the attraction the users of the head-mounted displays 1 and 200 enter.

The head-mounted display 1 executes an interconnection (Step S108). Similarly, the head-mounted display 200 executes an interconnection (Step S109). As illustrated in FIG. 9, in a case where the head-mounted displays 1 and 200 are interconnected, the interconnection may be executed from, for example, the head-mounted display 1 or from the head-mounted display 200. In a case where the head-mounted displays 1 and 200 are interconnected, it is assumed that the head-mounted displays 1 and 200 are prospectively interconnectable. For example, in a case where the attraction is an attraction where a game is proceeded by the group, when the processing corresponding to the attraction is identified from the facility application 81, the users of the head-mounted displays 1 and 200 may each execute an operation of allowing transition to an interconnectable state, or the head-mounted displays 1 and 200 may automatically transit to an interconnectable state.

After completion of the interconnection, the head-mounted display 1 transmits a preparation completion notification to the facility server 100 (Step S110). Similarly, after completion of the interconnection, the head-mounted display 200 transmits a preparation completion notification to the facility server 100 (Step S111).

The facility server 100 executes preparation completion determining processing for determining whether preparation for executing an attraction is completed (Step S112). The facility server 100 compares, for example, the number of participants in the attraction counted at Step S101 and that of the preparation completion notifications. When the numbers are equal, it can be determined that the preparation for executing the attraction is completed.

As a result of the determination, in a case where the preparation for executing the attraction is completed, the facility server 100 transmits an attraction initiation notification to the head-mounted displays 1 and 200, separately (Step S113).

When receiving the attraction initiation notification from the facility server 100, the head-mounted display 1 initiates processing corresponding to the attraction (Step S114). Similarly, when receiving the attraction initiation notification from the facility server 100, the head-mounted display 200 initiates processing corresponding to the attraction (Step S115).

A connection according to embodiments will be described using FIG. 10. FIG. 10 illustrates exemplary processing in a case where the head-mounted display 1 is connected to the head-mounted display 200.

As illustrated in FIG. 10, the head-mounted display 1 explores head-mounted displays existing within a wirelessly connectable area (Step S201).

Subsequently, the head-mounted display 1 displays a list of the head-mounted displays explored at Step S201 on the display 2a and/or display 2b (Step S202). At Step S202, in displaying the list of the head-mounted displays explored at Step S201, the head-mounted display 1 displays which head-mounted displays have group identifiers identical to those of the head-mounted display 1, in such a manner as to be visually recognized by the user of the head-mounted display 1.

Subsequently, the head-mounted display 1 determines whether pairing is completed (Step S203). For example, the head-mounted display 1 determines whether selection of a head-mounted display to be interconnected in the list of the head-mounted displays displayed at Step S202 has been received from the user of the head-mounted display 1.

In a case where pairing is not completed (No at Step S203) as a result of the determination, the head-mounted display 1 repeats the determination at Step S203. In contrast, in a case where pairing is completed as a result of the determination (Yes at Step S203), the head-mounted display 1 interconnects with the paired head-mounted display (Step S204) and completes the processing illustrated in FIG. 10.

At the Step S202, in displaying the list of the head-mounted displays explored at Step S201, the head-mounted display 1 may display only the head-mounted displays with group identifiers identical to those of the head-mounted display 1. In a case where only the head-mounted displays with group identifiers identical to those of the head-mounted display 1 are displayed, the head-mounted display 1 can execute the interconnection at Step S204 in response to a connecting instruction from the user.

In some embodiments mentioned above, the head-mounted display 1 interconnects communicably with other head-mounted displays with identical group identifiers, for example. Therefore, according to some embodiments mentioned above, the head-mounted display 1 can be improved in usability in the attractions where games are proceeded by the group, for example.

In some embodiments mentioned above, the head-mounted display 1 synchronizes timing for initiating processing of attractions among other interconnected head-mounted displays by, for example, initiating processing corresponding to the attractions, in response to receipt of the attraction initiation notification transmitted from the facility server 100. Therefore, according to some embodiments mentioned above, the head-mounted display 1 can be improved in usability in the attractions where games are proceeded by the group, for example.

In some embodiments mentioned above, the head-mounted display 1 stores data on games transmitted and received in accordance with the progresses of the games among other interconnected head-mounted displays as the group shared data 85. Therefore, according to some embodiments mentioned above, the head-mounted display 1 can be improved in usability in the attractions where games are proceeded by the group, for example.

Some embodiments mentioned above describe an example where the head-mounted display 1 interconnects with other head-mounted displays with identical group identifiers. However, the embodiments are not limited to this example, and the head-mounted display 1 may interconnect with other head-mounted displays in preparation for executing identical applications, for example. By trading applications in preparation for being executed among other interconnectable head-mounted displays, the head-mounted display 1 can identify head-mounted displays in preparation for executing identical applications among other interconnectable head-mounted displays.

Figure 11:
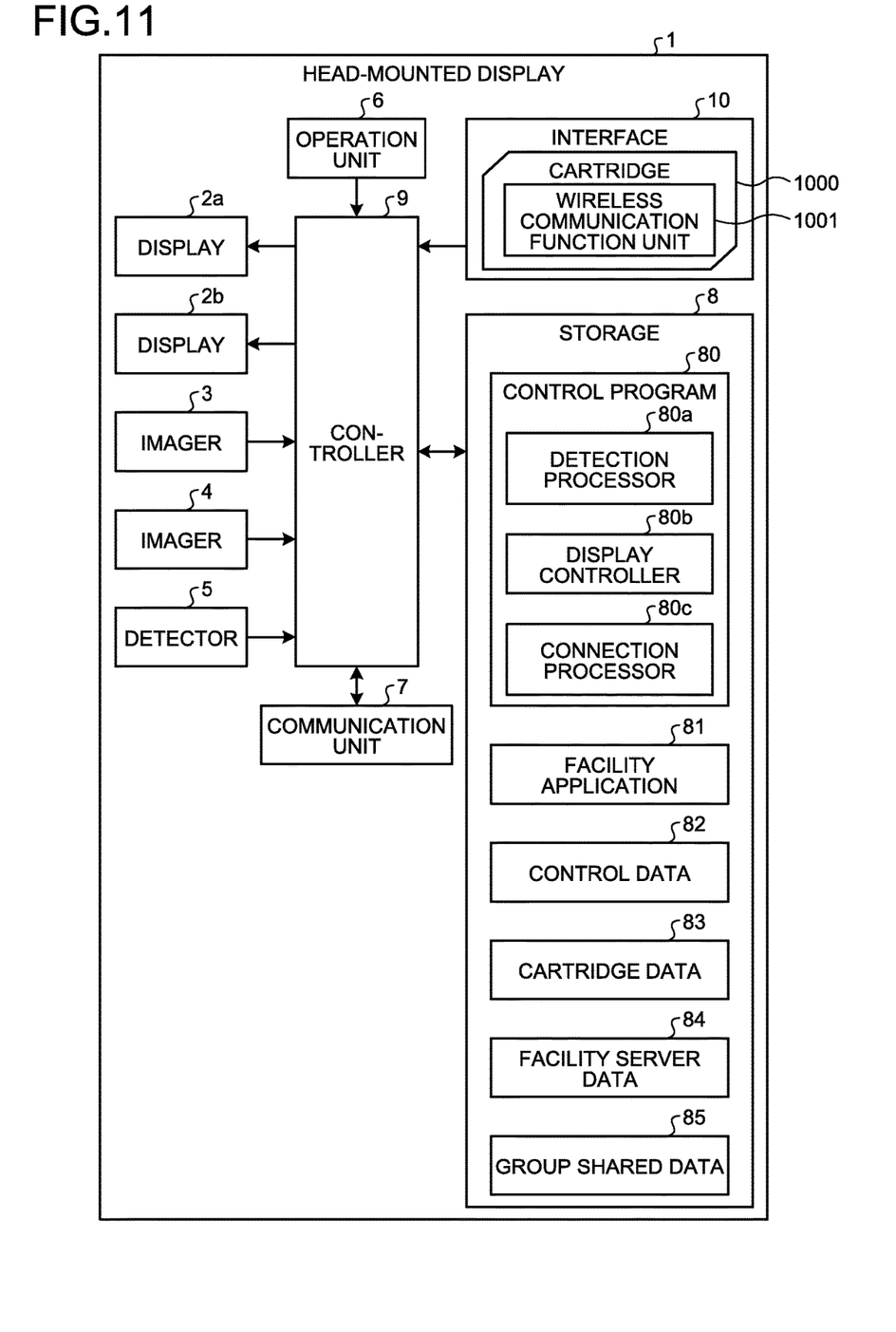
FIG. 11 is a block diagram illustrating another exemplary functional configuration of a head-mounted display according to embodiments.

FIG. 11 is a block diagram illustrating another exemplary functional configuration of the head-mounted display according to embodiments. In some embodiments mentioned above, the head-mounted display 1 may, for example, as illustrated in FIG. 11, interconnect with other head-mounted displays via a wireless communication function unit 1001 included in the connected cartridge 1000.

Although the technology according to the claim has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-mounted display comprising:
an interface configured to connect to a cartridge; and
a controller configured to execute an application based on data obtained from the cartridge when the cartridge is connected to the interface,
wherein the controller is configured to
explore other devices, the other devices comprising the head-mounted displays, existing within an interconnectable area in executing the application,
communicate and connect with at least one other device corresponding to the application among the other explored devices,
transmit a request of the corresponding application to a facility server, and
process the corresponding application in response to receiving an attraction initiation notification from the facility server.

2. The head-mounted display according to claim 1, wherein the controller is configured to communicate and connect with other devices with identical group identifiers included in the data.

3. The head-mounted display according to claim 2, wherein the controller is configured to synchronize timing for executing the application among other devices that are in communication and connection with the head-mounted display.

4. The head-mounted display according to claim 2, wherein the controller is configured to transmit and receive information obtained during execution of the application among other devices that are in communication and connection with the head-mounted display.

5. The head-mounted display according to claim 1, wherein the controller is configured to communicate and connect with other devices in preparation for executing an application identical to the application.

6. The head-mounted display according to claim 5, wherein the controller is configured to synchronize timing for executing the application among other devices that are in communication and connection with the head-mounted display.

7. The head-mounted display according to claim 5, wherein the controller is configured to transmit and receive information obtained during execution of the application among other devices that are in communication and connection with the head-mounted display.

8. The head-mounted display according to claim 1, wherein
the cartridge includes a wireless communication function unit, and
the controller is configured to communicate and connect with the other devices via the wireless communication function unit included in the cartridge connected to the interface.

9. The head-mounted display according to claim 1, wherein the controller is configured to, upon reading the data from the cartridge,
explore the other devices existing within the interconnectable area in executing the application, and
communicate and connect with the another device associated to the application among the other devices.

10. The head-mounted display according to claim 1, further comprising:
a display;
a front portion surrounding at least a partial portion of an outer circumference of the display; and
a temple portion having an end portion connected to the front portion, wherein
the interface is provided on an inner face side of the front portion and configured to face toward a user of the head-mounted display.

11. The head-mounted display according to claim 1, further comprising:
a display;
a front portion surrounding at least a partial portion of an outer circumference of the display; and
a temple portion having an end portion connected to the front portion,
wherein the interface is provided in the temple portion.

* * * * *